United States Patent
Knoll et al.

(10) Patent No.: US 7,619,506 B2
(45) Date of Patent: Nov. 17, 2009

(54) DEVICE FOR SENSING TRACTOR TRAILER CONNECTION

(75) Inventors: Paul James Knoll, Greenville, WI (US); Jeffrey J. Rhine, Poway, CA (US); Kip Leggett, Chula Vista, CA (US); John Phillip Oeth, Cardiff by the Sea, CA (US); David C. Stillinger, Cardiff, CA (US); David DeVinny, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 11/510,033

(22) Filed: Aug. 24, 2006

(65) Prior Publication Data
US 2007/0152802 A1    Jul. 5, 2007

Related U.S. Application Data

(60) Provisional application No. 60/711,540, filed on Aug. 25, 2005.

(51) Int. Cl.
*G08B 21/00* (2006.01)
(52) U.S. Cl. .................. 340/431; 340/988; 340/679; 280/789
(58) Field of Classification Search ............. 340/431, 340/531, 539.1, 426.18, 988, 679; 280/789, 280/423.1, 433
See application file for complete search history.

(56) References Cited

U.S. PATENT DOCUMENTS 3,682,497 A * 8/1972 Dalton ................... 254/419
4,816,802 A * 3/1989 Doerksen et al. ........... 340/447
5,226,675 A * 7/1993 Noah et al. ............... 280/439

(Continued)

FOREIGN PATENT DOCUMENTS

EP      0 051 464 A2    5/1982

(Continued)

OTHER PUBLICATIONS

International Search Report - PCT/US06/033239 - International Search Authority - European Patent Office - Jan. 11, 2007.

(Continued)

*Primary Examiner*—Daniel Previl
(74) *Attorney, Agent, or Firm*—Richard A. Bachand; Ashish L. Patel

(57) ABSTRACT

A sensor device for detecting whether a tractor and a trailer of a truck are connected includes a container having a plurality of tabs extending radially outwardly to engage an inside surface of a bearing plate of the trailer when the container is located in a hole in the bearing plate. A spring extends from a base of the container away from the face surface to bear upon an interior wall of the trailer to bias the tabs into contact with the inside wall when the container is located in the hole to maintain a position of the container therein. A sensor is also provided for sensing proximity of a ferrous material and being located in the container. The sensor senses proximity of ferrous material of a coupler carried by the tractor without sensing ferrous material of the bearing plate.

16 Claims, 4 Drawing Sheets

U.S. PATENT DOCUMENTS

| | | | |
|---|---|---|---|
| 5,477,207 A * | 12/1995 | Frame et al. | 340/431 |
| 6,866,283 B2 * | 3/2005 | Alguera et al. | 280/432 |
| 7,036,839 B2 * | 5/2006 | Hungerink et al. | 280/433 |
| 7,237,790 B2 * | 7/2007 | Gehring et al. | 280/477 |
| 7,257,904 B1 * | 8/2007 | Brown et al. | 33/562 |
| 2004/0075241 A1 | 4/2004 | Alguera et al. | |

FOREIGN PATENT DOCUMENTS

| | | |
|---|---|---|
| EP | 0 406 036 A1 | 1/1991 |
| WO | WO 03/044632 A2 | 5/2003 |

OTHER PUBLICATIONS

Written Opinion - PCT/US06/033239 - International Search Authority - European Patent Office - Jan. 11, 2007.

International Preliminary Report on Patentability - PCT/US06/033239 - The International Bureau of WIPO - Switzerland - Feb. 26, 2008.

* cited by examiner

DEVICE FOR SENSING TRACTOR TRAILER CONNECTION

CLAIM OF PRIORITY UNDER 35 U.S.C. §119

The present Application for Patent claims priority to Provisional Application No. 60/711,540 entitled "SENSOR FOR DETECTING WHETHER A TRACTOR AND A TRAILER OF A TRUCK ARE CONNECTED" filed Aug. 25, 2005, and assigned to the assignee hereof and hereby expressly incorporated by reference herein.

BACKGROUND

In the trucking industry, asset tracking has become widespread in use. More particularly, tracking the location, movement, and other conditions of the tractors and trailers of trucks has found increased interest. In many cases, trailers themselves have been provisioned with their own tracking and reporting devices, some using, for example, GPS location based services, and having sensors for reporting to remote monitoring stations such information as trailer loading conditions, internal temperatures, maintenance schedules, and the like.

In many instances, as a part of such monitoring processes, it is desirable to determine from such remote locations whether a trailer is actually connected to a tractor. Thus, a sensor device is needed that can determine whether such connection exists to enable the asset tracking equipment to report the connected state to a monitoring location.

SUMMARY

Broadly, a sensor device is disclosed for detecting whether a tractor and a trailer of a truck are connected. The sensor includes a container having a plurality of tabs extending radially outwardly to engage an inside surface of a bearing plate of the trailer when the container is located in a hole in the bearing plate. The container has a face surface that is substantially parallel to a bearing face of the bearing plate when the container is located in the hole. A spring extends from a base of the container away from the face surface to bear upon an interior wall of the trailer to bias the tabs into contact with the inside wall when the container is located in the hole to maintain a position of the container therein. A sensor is also provided for sensing proximity of a ferrous material and being located in the container. The sensor senses proximity of ferrous material of a coupler carried by the tractor without sensing ferrous material of the bearing plate.

BRIEF DESCRIPTION OF THE DRAWINGS

In the various figures of the drawing, like reference numerals are used to denote like or similar parts. Additionally, the parts shown are not necessarily drawn to scale, and may be exaggerated or distorted for clarity of illustration or ease of description.

DETAILED DESCRIPTION

Figure 1:
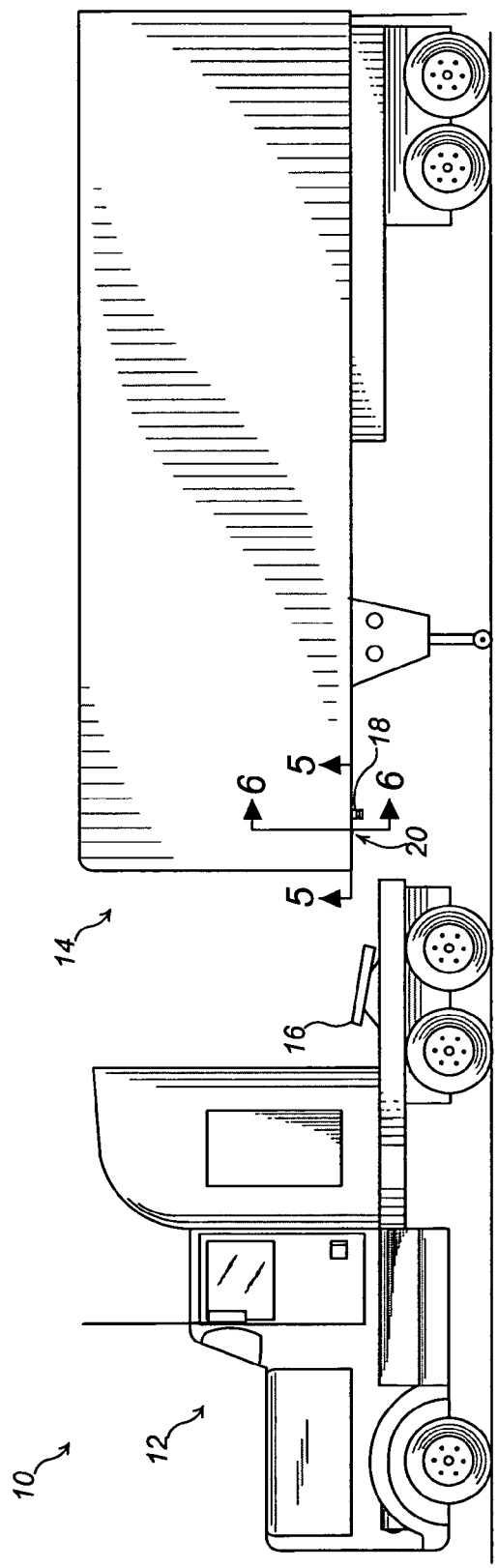
FIG. 1 is a plan view of a truck having a tractor and trailer that are not connected.
Figure 2:
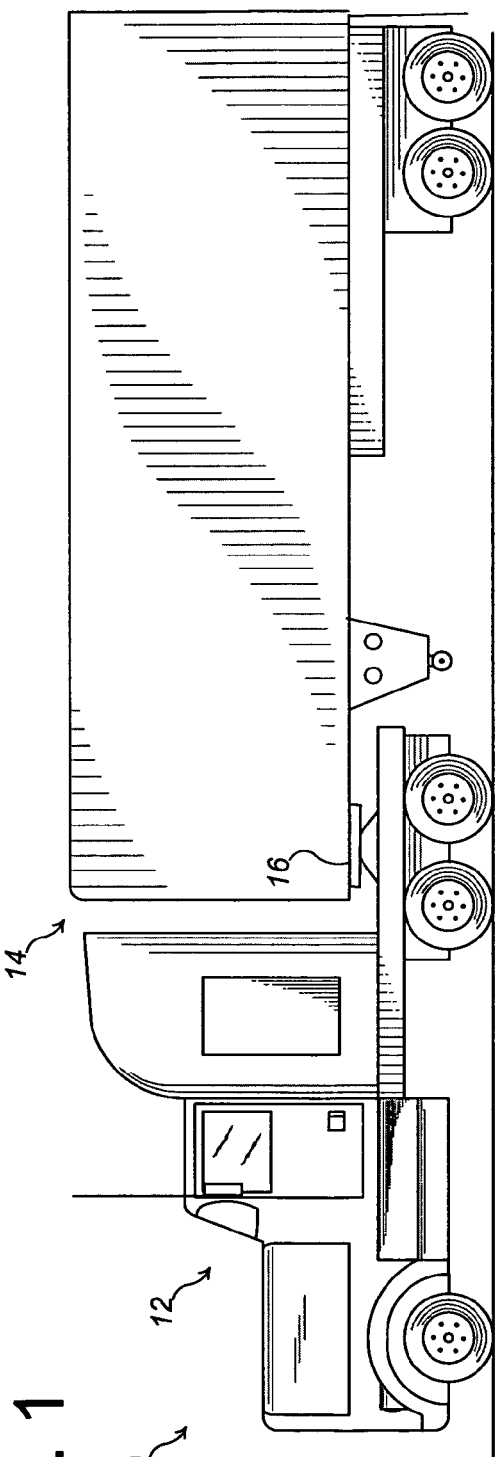
FIG. 2 is a plan view of the truck of FIG. 1 in which the tractor and trailer that are connected.

A typical truck 10 is shown in FIGS. 1 and 2, respectively in unconnected and connected states. The truck 10 has a tractor 12 and trailer 14, which, in the embodiment illustrated, are selectively connected by a fifth-wheel hitch 16 carried by the tractor 12 that engages a king pin 18 affixed to the trailer 14, in known manner. Although a tractor-trailer embodiment is primarily described in conjunction with one sensor embodiment below, it should be understood that other types of hitch arrangements may also be employed. For example, frequently trailers are moved intermodally in which the trailers are moved for at least part of their journey by rail cars. Typically, for instance, trailers are moved onto railcars by a crane, and fastened in place, at least in part, by a hitch of construction similar to the normal fifth-wheel tractor hitch. In such and similar embodiments, sensor of the type described herein may be employed to sense attachment to the railcar.

Thus, a sensor device 20 is provided in proximity to a kingpin 18 of the trailer 14 to sense when the tractor 12 is connected to the trailer 14. The sensor device 20 is constructed to enable it to be mounted in a hole in the bearing plate of the trailer 14, in a manner described in greater detail below. The details of the sensor device 20 are best seen in FIGS. 3 and 4, to which reference is now additionally made.

Figure 3:
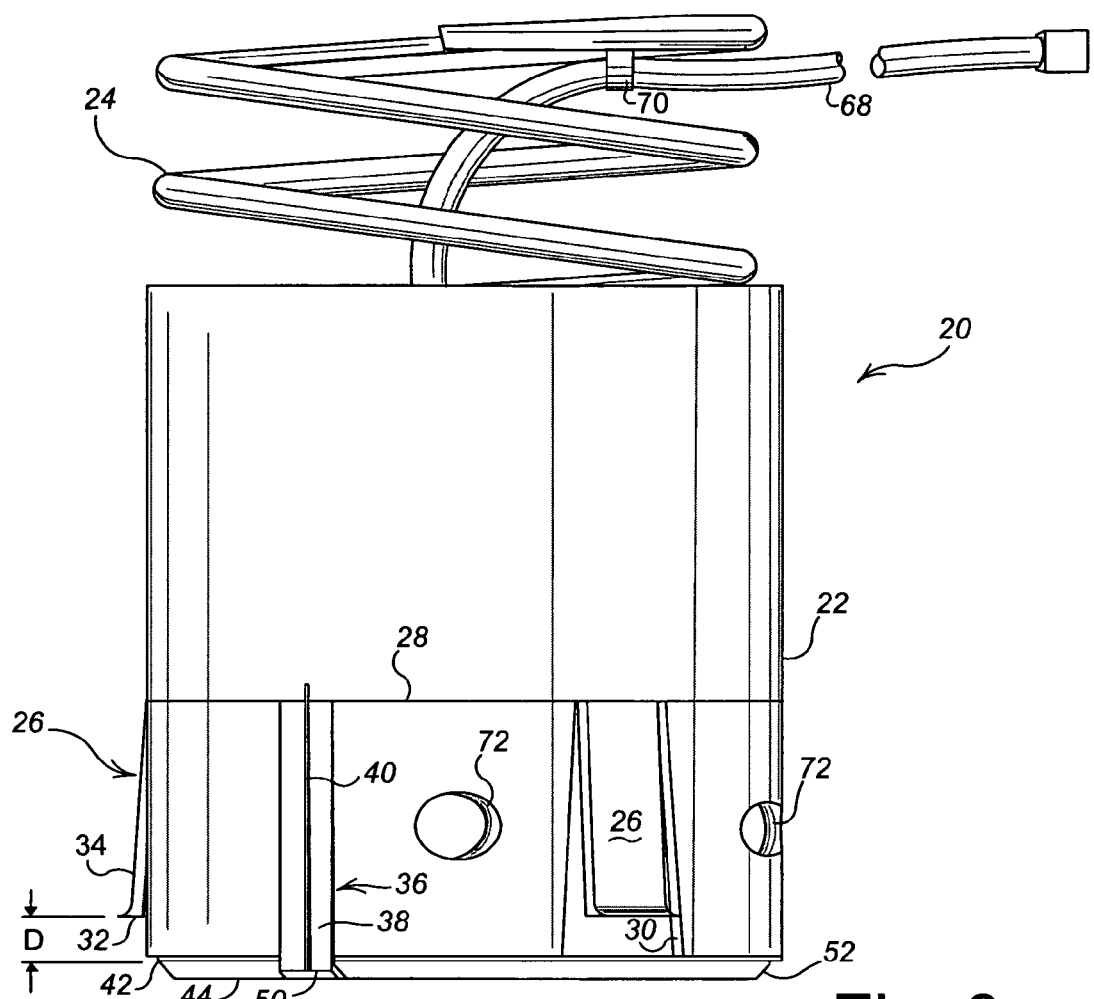
FIG. 3 is a plan view of a sensor device for sensing whether the tractor and trailer of the truck of FIG. 1 are connected.
Figure 4:
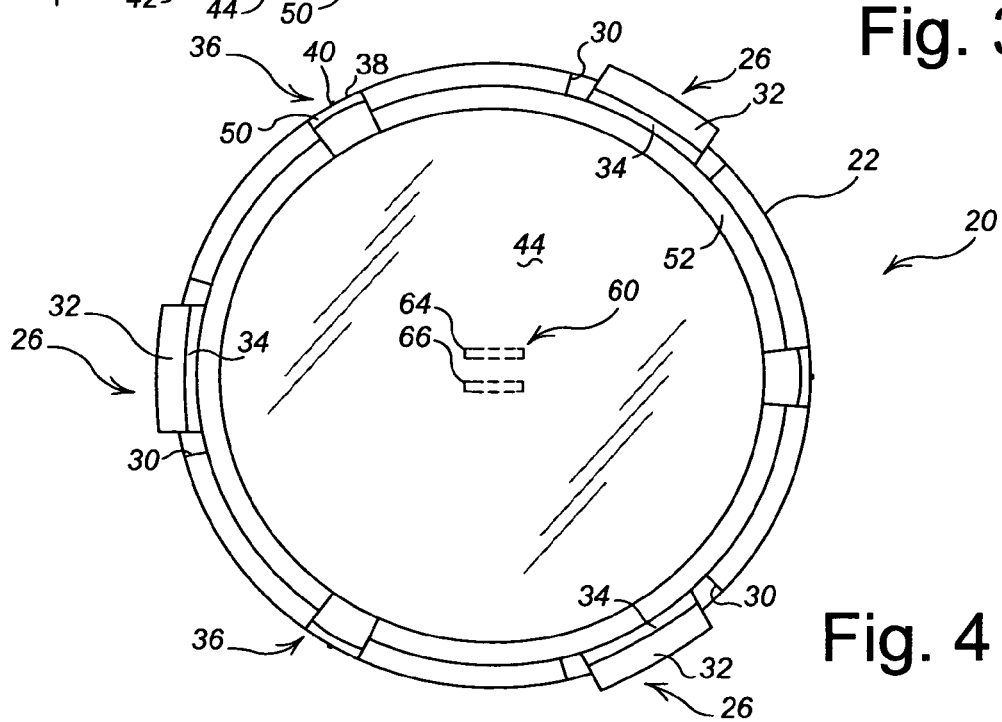
FIG. 4 is a plan view of a face surface of the sensor device of FIG. 3.
Figure 5:
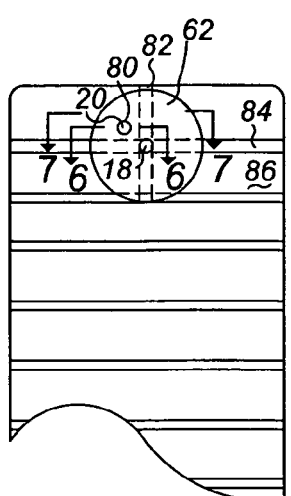
FIG. 5 is a cut away view of the underside of a trailer of FIG. 1 taken at 5-5, showing a sensor device in proximity to a kingpin for attachment to a fifth-wheel trailer hitch of a truck tractor.

The sensor device 20 has a hollow, cylindrically shaped body 22 containing a spring 24, best seen in FIG. 3, which partially extends from within the body 22. The body 22 and its attendant features, described below, may be injection molded from any suitable material that is nonconductive to magnetic fields. Examples of such materials include thermoplastic materials, for example, styrene, polystyrene, plastic, nylon, ethylene, polyethylene, or the like. Additional suitable materials are manifold. Although the body 22 is described as having a cylindrical shape, other shapes may also be suitable, such as oval, square, or the like. Also, the body 22 is shown as being hollow, it may be solid, depending upon the application. The hollow embodiment shown is of lighter weight than a solid embodiment, however.

The body 22 has a plurality of tabs 26 extending outwardly from its periphery. Although in the embodiment shown, three equally spaced tabs 26 are shown, any number of tabs may be provided to achieve the particular function needed of holding the body 22 in place. The tabs 26 may be formed as a part of the molding process in the fabrication of the body 22. For example, a two-part mold may be used in which the structures on one side of the parting line 28 are formed in a first half of the mold and the structures on the other side of the parting line 28 are formed in a second half of the mold.

In the embodiment shown, the tabs 26 are formed, for example, in cavities 30 in the body 22. By forming the tabs 26 of material taken from the cavities 30, the material of the tabs 26 will not leave openings into the body 22, and the integrity of the body 22 can be maintained to thereby protect its interior from intrusion by grease and other contaminants that otherwise may enter. Thus, the tabs may be fabricated in a single half of the mold to extend outwardly from the body 22 to have a face portion 32 at the end of a supporting base 34 that may flex to a desired degree in use. The face portions 32 of the tabs 22 are located a distance "D" from a shoulder 42 of the bearing surface 44 of the body 22, the distance "D" corresponding to the thickness of the bearing plate in which the body 22 will be mounted to constrain the body 22 therein.

To help secure the body 22 in its mounting hole, as described below in detail, a plurality of crush ribs 36 is provided around the periphery of the body 22. The crush ribs 36 may have a plurality of layers of material to bear upon the walls of the hole in which the body 22 is located, so that once located, the body 22 is securely held therein. In the embodiment shown, the crush ribs have a base portion 38 with an outstanding smaller rib portion 40. The top portion 50 of the crush ribs may be tapered as shown in order to provide a sliding capability against the fifth wheel against which they will ride in operation, as below described.

The body 22 has a substantially flat face that provides a bearing surface 44 that will ride against the fifth wheel in operation. The peripheral edges of the bearing surface 44 are tapered 52 in order to provide a sliding capability against the fifth wheel, as below described.

A sensor 60 is provided within the container 20 for sensing proximity of the ferrous material of a coupler or fifth-wheel hitch 16 carried by the tractor 12. The sensor 60 is located in the container 20 in such a manner that the sensor 60 senses proximity of the ferrous material of the hitch without sensing ferrous material of the bearing plate 62 (best seen in FIGS. 5-8) in which the container 20 is mounted. It will be appreciated that some experimentation may be required in order to determine the optimum location for a particular installation.

The sensor 60 may include a magnet 64 and a reed switch 66 that operates in the presence of a magnetic field. Thus, when the ferromagnetic material of the hitch 16 is sufficiently close to the magnet 64 and reed switch 66, it conducts a portion of the magnetic field created by the magnet 64 to the reed switch 66 to operate the reed switch 66.

Although various sensors may be used, the use of a magnet and reed switch, as in the embodiment illustrated, eliminates the need for power to operate the sensor. Of course, power is required to sense the state of the reed switch, but the passive sensor elements do not dissipate power of the associated electronics (not shown) that are used to report the connection status to a remote monitoring location (not shown). Since a particular trailer with which the sensor 20 may be used may experience long periods during which it is not connected to a trailer, and since during the unconnected time the associated electronics may rely on backup battery power, the selection of the sensor type may deserve special consideration. A pair of wires 68 is connected to the reed switch 66 to enable its state to be determined by the associated electronics. The pair of wires 68 may be contained in a single insulating sheath, as shown, which may be held in position by a vinyl strap 70, or the like.

The sensor 60 and a portion of the wires 68 that connects thereto may be enclosed in a potting or encapsulating material (not shown), such as epoxy, or other suitable material, to isolate them from water or other deleterious materials that may inadvertently enter the container 20. The encapsulating material may, for example, be poured into the container 20 to the level of drain holes 72 in the sidewall thereof and allowed to harden therein.

The operation of the sensor device 20 is illustrated in FIGS. 5-8, to which reference is now additionally made. The sensor device 20 is mounted in a hole 80 of a bearing plate 62 of a trailer 14, in proximity to the kingpin 18. The location of the hole 80, and ultimately the sensor device 20 located therein, should be selected to be spaced from underlying braces 82 and 84, yet not to be so far away from the kingpin 18 as to miss contact with the fifth-wheel hitch when connected.

In the embodiment shown, the bearing plate 62 is shown as being circular in shape, affixed to cross braces 82 and 84 of the trailer 14. However, as known, the bearing plate 62 may be of any appropriate shape, and may be affixed to the trailer 14 by any suitable means, its primary function being to provide a bearing surface or face against which the bearing face of the fifth-wheel hitch 16 may ride. Typically, grease (not shown) is used for lubrication between the bearing plate 62 and fifth-wheel hitch 16.

Figure 6:
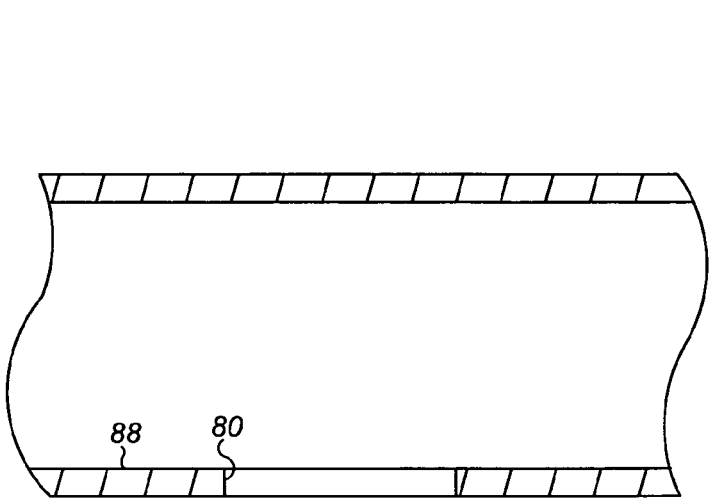
FIG. 6 is a cut-away portion of the trailer of FIGS. 1 and 5, taken at 6-6, also showing a sensor device prior to insertion into a mounting hole in a bearing plate of the trailer.
Figure 7:
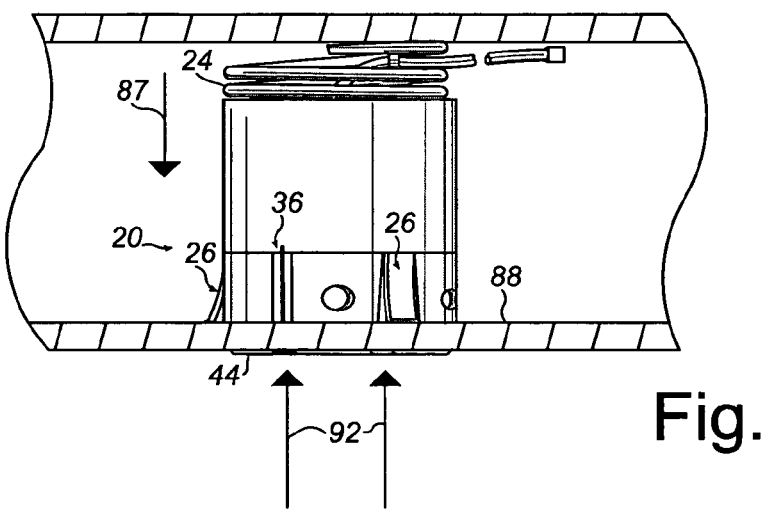
FIG. 7 is a cut-away portion of the trailer of FIG. 5, taken at 7-7, showing a sensor device after insertion into the mounting hole in the bearing plate of the trailer.

The bearing plate 62 is spaced from the floor 86 of the trailer 14, providing an airspace therebetween in which the sensor device 20 is be located in use. Thus, as best seen in FIGS. 6 and 7, the sensor device 20 is inserted into the hole 80 of the bearing plate 62 SO that the spring 24 contacts the floor 86 of the trailer 14, and compresses there against. The spring 24 acts to bias the sensor device in the direction of the bearing plate 62, as shown by the arrow 87. In this state, as best seen in FIG. 7, the tabs 26 engage the inside surface 88 of the bearing plate 62 to hold the sensor device in its inserted position. Since the supporting base 34 of the tabs 26 may flex somewhat, a tight fit is maintained. Moreover, the crush ribs 36 also maintain the tight fit of the sensor device 20 within the hole 80.

In the position shown in FIG. 7, the bearing surface 44 of the sensor device 20 extends slightly outwardly from the bearing face 90 of the bearing plate 62. Thus, the bearing face of the fifth wheel 16 can contact the bearing surface 44 in the direction of the arrows 92. This facilitates a rubbing action between the fifth-wheel hitch and the bearing surface 44 during articulation between the tractor 12 and trailer 14. This rubbing action serves to wipe away grease from the bearing surface 44, so that any metal filings or particles in the grease will not cause a false triggering of the sensor.

Figure 8:
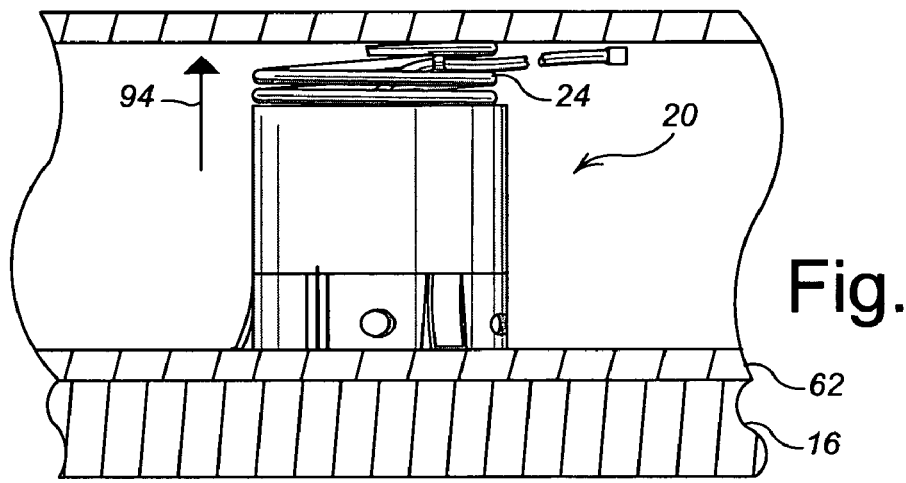
FIG. 8 is the cut-away portion of the trailer of FIGS. 7, showing the sensor device and bearing plate of the trailer in proximity to a fifth wheel trailer hitch in operation.

Because of the compression of the spring 24, the overall sensor device 20 is somewhat compliant when exposed to the various forces that may be applied to it by differently designed fifth-wheel geometries with which it may be used. Thus, as seen in FIG. 8, when the fifth-wheel hitch 16 is brought into operating position with respect to the bearing plate 62, an upward force is exerted on the sensor device 20, as shown by the arrows 94, bringing the bearing surface 44 into direct contact with the fifth-wheel hitch 16.

Figure 9:
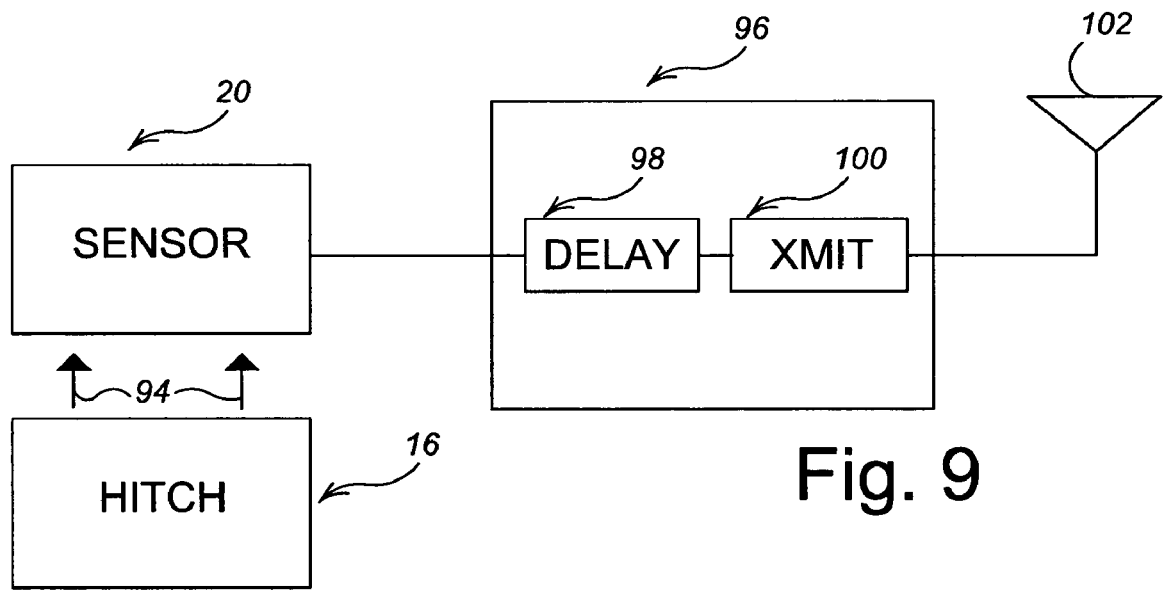
FIG. 9 is a box diagram showing one embodiment of an operation of the sensor device of FIGS. 3-8.

One operation embodiment of the sensor device 20 is shown in FIG. 9, to which reference is now additionally made. As the fifth-wheel hitch 16 is moved in the direction of arrows 94 into proximity with the sensor 20, the sensor 20 senses the presence of the ferromagnetic material in the hitch and changes state. The state change is sensed by the associated electronics 96, which transmits a signal by transmitter 100 via an antenna 102 to a remote location (not shown). The transmitter 100 may be, for example, a wireless cell phone device, a satellite communications device, or other suitable device.

If desired, a delay feature 98 may optionally be provided. Oftentimes, trailers 14 are moved around freight yards by tugs, tractors, or other vehicles, which only temporarily connect to the trailer being moved. To prevent such short-term connections from being sensed as a trailer connection, a delay may be introduced in the sensing function. The time of the delay may be selected according to the particular application, for example, 20 minutes being a typical delay that may be useful.

Although the invention has been described and illustrated with a certain degree of particularity, it should be understood that the present disclosure has been made by way of example only, and that numerous changes in the combination and arrangement of parts may be made without departing from the spirit and scope of the invention, as set forth in the appended claims.

What is claimed is:

1. A sensor device for detecting whether a trailer is connected to a hitch, comprising:
   a container;
   tabs extending from said container to engage an inside surface of a bearing plate of said trailer when said container is located in a hole in said bearing plate;
   said container having a face surface that is substantially parallel to a bearing face of said bearing plate when said container is located in said hole;
   a spring extending from a base of said container away from said face surface to bear upon an interior wall of said trailer to bias said tabs into contact with said inside wall when said container is located in said hole to maintain a position of said container therein; and
   a sensor for sensing proximity of a ferrous material and being located in said container, wherein said sensor senses proximity of ferrous material of the hitch without sensing ferrous material of said bearing plate.

2. The sensor device of claim 1 wherein said hitch is a fifth-wheel hitch.

3. The sensor device of claim 2 wherein said face surface has a tapered peripheral edge to facilitate sliding movement between said face surface and a load bearing surface of said fifth-wheel hitch.

4. The sensor device of claim 1 wherein said container is cylindrically shaped.

5. The sensor device of claim 1 further comprising a plurality of crush ribs extending radially away from said container to engage a wall of said hole to assist said container to snugly fit in said hole.

6. The sensor device of claim 1 wherein said sensor comprises a magnet and a reed switch that operates in the presence of a magnetic field, whereby ferromagnetic material that is sufficiently close to said magnet and reed switch conducts a magnetic field created by said magnet to said reed switch to operate said reed switch.

7. A sensor device for detecting whether a tractor and a trailer of a truck are connected, comprising:
   a container;
   a plurality of tabs extending radially outwardly from said container to engage an inside surface of a bearing plate of said trailer when said container is located in a hole in said bearing plate;
   said container having a face surface that is substantially parallel to a bearing face of said bearing plate when said container is located in said hole;
   a spring extending from a base of said container away from said face surface to bear upon an interior wall of said trailer to bias said tabs into contact with said inside wall when said container is located in said hole to maintain a position of said container therein; and
   a sensor for sensing proximity of a ferrous material and being located in said container wherein said sensor senses proximity of ferrous material of a coupler carried by said tractor without sensing ferrous material of said bearing plate.

8. The sensor device of claim 7 wherein said coupler carried by said tractor is a fifth wheel trailer hitch.

9. The sensor device of claim 8 wherein said face surface has a tapered peripheral edge to facilitate sliding movement between said face surface and a load bearing surface of said fifth wheel trailer hitch.

10. The sensor device of claim 7 wherein said container is cylindrically shaped.

11. The sensor device of claim 7 further comprising a plurality of crush ribs
    extending radially away from said container to engage a wall of said hole to cause said container to snugly fit in said hole.

12. The sensor device of claim 7 wherein said sensor comprises a magnet and a reed switch that operates in the presence of a magnetic field, whereby ferromagnetic material that is sufficiently close to said magnet and reed switch conducts a magnetic field created by said magnet to said reed switch to operate said reed switch.

13. A sensor device for detecting whether a tractor and a trailer of a truck are connected, comprising:
    a cylindrical container of material that is substantially nonconducting of magnetic fields;
    a plurality of tabs of said nonconducting material, each extending radially outwardly from said container to engage an inside surface of a bearing plate of said trailer when said container is located in a hole in said bearing plate;
    said container having a face surface that is substantially parallel to a bearing face of said bearing plate when said container is located in said hole;
    a biasing means for biasing said tabs away from an interior wall of said trailer into contact with said inside wall when said container is located in said hole to maintain a position of said container therein; and
    a magnet and a switch in said container, said switch being of the type that changes states in the presence of a magnetic field, whereby when ferrous material of a coupler carried by said tractor comes into proximity with said magnet and switch, a magnetic field of said magnet is conducted into proximity of said switch to cause said switch to change states.

14. The sensor device of claim 13 wherein said coupler carried by said tractor is a fifth wheel trailer hitch.

15. The sensor device of claim 13 wherein said face surface has a tapered peripheral edge to facilitate sliding movement between said face surface and a load bearing surface of said fifth wheel trailer hitch.

16. The sensor device of claim 13 further comprising a plurality of crush ribs extending radially away from said container to engage a wall of said hole to cause said container to snugly fit in said hole.

* * * * *